Aug. 23, 1966 C. B. SATTERTHWAITE ET AL 3,267,730
SENSING ELEMENT FOR THE MEASUREMENT OF LIQUID LEVEL
Filed Oct. 11, 1963 2 Sheets-Sheet 1
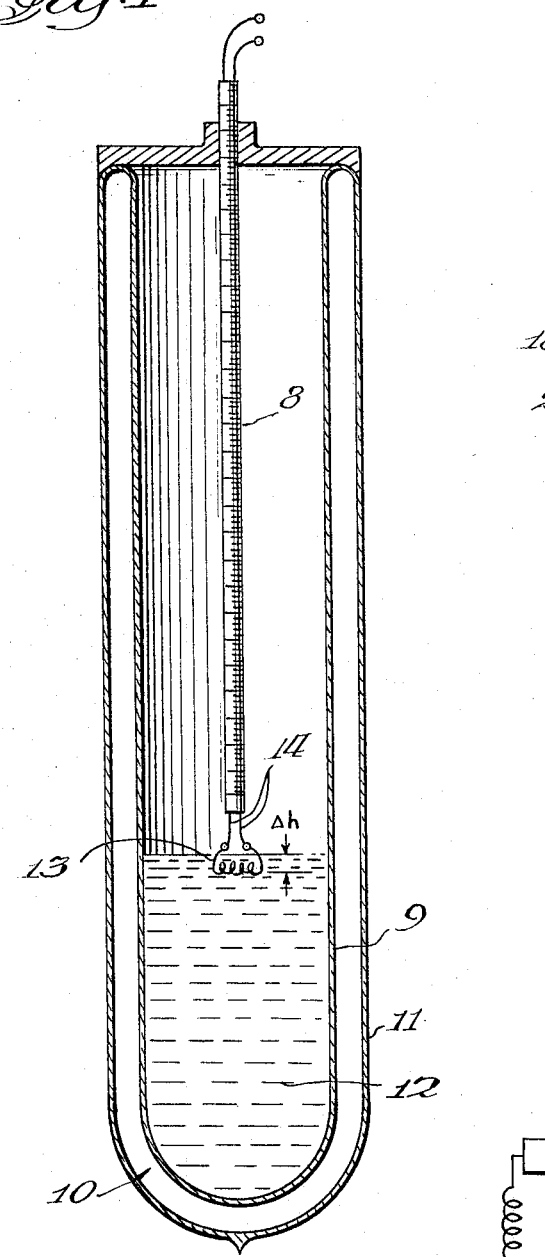
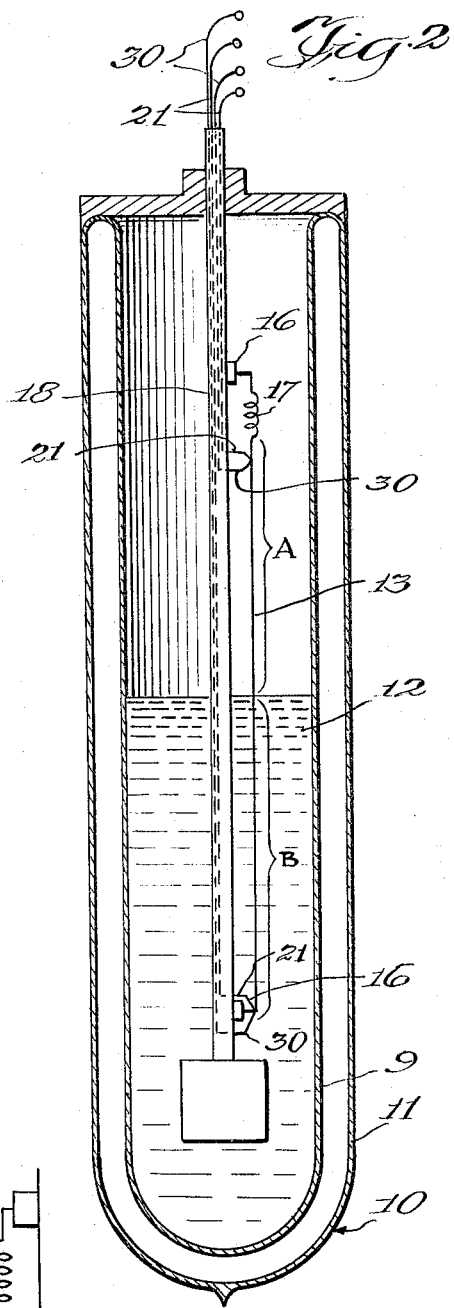
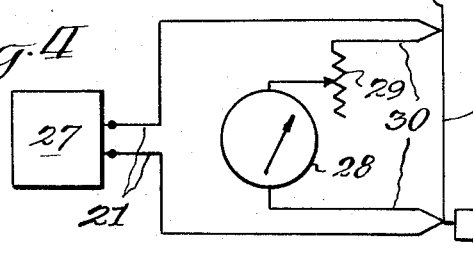
Inventors
Cameron B. Satterthwaite
Roger P. Ries
By
Merriam, Smith & Marshall
Attorneys Aug. 23, 1966  C. B. SATTERTHWAITE ET AL  3,267,730
SENSING ELEMENT FOR THE MEASUREMENT OF LIQUID LEVEL
Filed Oct. 11, 1963  2 Sheets-Sheet 2
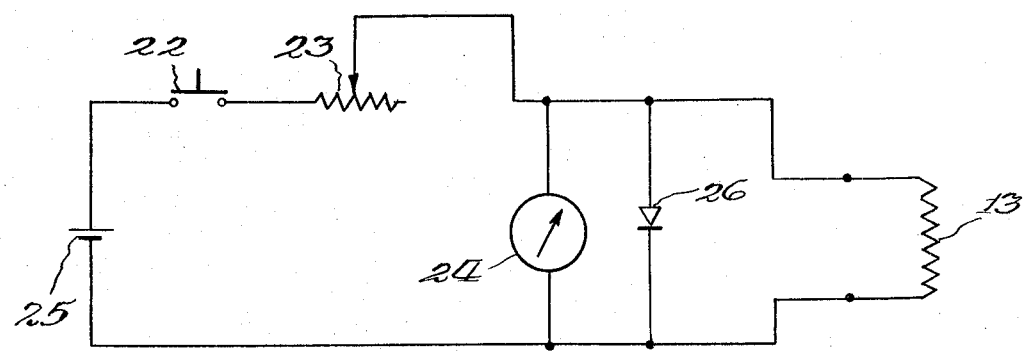
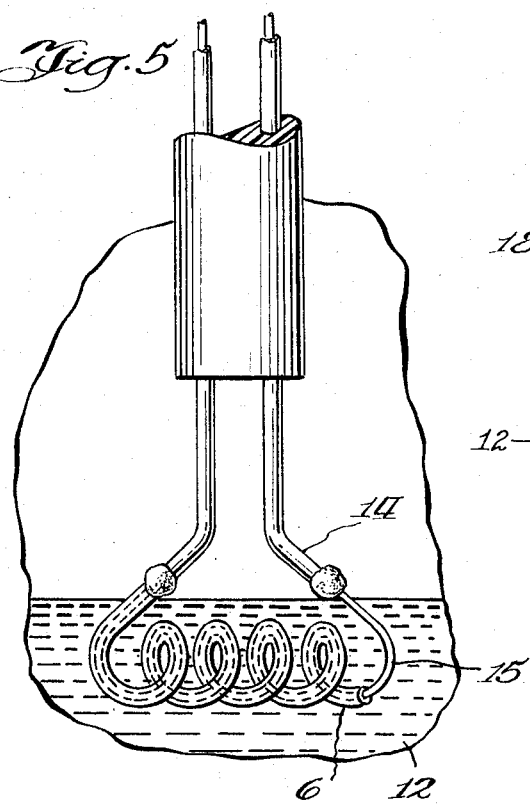
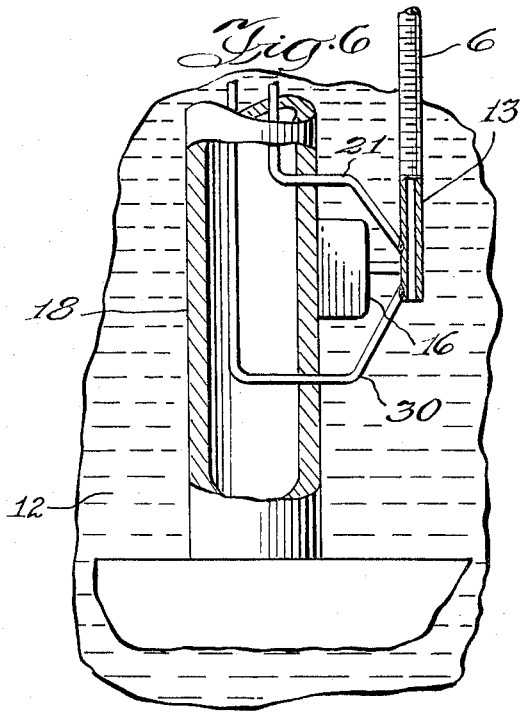
Inventors
Cameron B. Satterthwaite
Roger P. Ries
By Merriam, Smith & Marshall
Attorneys

3,267,730
SENSING ELEMENT FOR THE MEASUREMENT OF LIQUID LEVEL

Cameron B. Satterthwaite and Roger P. Ries, Urbana, Ill., assignors to University of Illinois Foundation, Urbana, Ill.
Filed Oct. 11, 1963, Ser. No. 315,443
6 Claims. (Cl. 73—295)

The present invention relates generally to an improved depth gauge for sensing the liquid level in a container. More particularly, this invention relates to an improved sensing element in a depth gauge.

In measuring the level of liquid in a container, a method is used whereby a pure super-conductor sensing element having a meter or indicator light attached thereto is immersed in the liquid. Though helium is the liquid whose level is generally measured, the level of other substances, e.g., hydrogen whose temperature in a liquid state is sufficiently low to effect a transition of resistance in a super-conducting material, can also be measured. When the element makes contact with the liquid, the resistance in the element is drastically reduced thus actuating a light or meter either by a reduction of voltage across the element or an increased current through it. Most measuring instruments, e.g., depth gauges, presently used for ascertaining the exact level of liquid are quite expensive, unstable in operation and, physically, very fragile. Moreover, using a pure super-conductor for a sensing element has presented a number of practical problems owing to the difficulty of making the super-conducting to normal interface coincide with the liquid level. To alleviate these difficulties, we have invented a novel sensing element herein described wherein a super-conductor material is coated on a conventional resistance wire, e.g., manganin or constantan. This has resulted in an improved super-conducting element which is much more stable in operation than the pure super-conductors presently used. As opposed to conventional super-conductors, the sensing element of this invention is relatively inexpensive and easily made.

Other features and advantages are inherent in the structure claimed and disclosed, as will be apparent to those skilled in the art from the following detailed description in conjunction with the accompanying drawings wherein:

FIGURE 1 shows a container filled with liquid wherein a single position level indicator is used for measuring the level of the liquid;

FIGURE 2 shows a liquid-filled container wherein a proportional level indicator is used for measuring the liquid;

FIGURE 3 is a circuit diagram illustrating a suitable means for measuring the liquid level in the embodiment shown in FIGURE 1;

FIGURE 4 is a circuit diagram illustrating a suitable means for measuring the liquid level as in the embodiment shown in FIGURE 2;

FIGURE 5 is an enlarged fragmentary view of the sensing element shown in FIGURE 1; and FIGURE 6 is an enlarged fragmentary view of the sensing element shown in FIGURE 2.

In FIGURE 1, liquid 12 is located in a container 10 having an inner vessel 9 and an outer shell 11 spaced therefrom with suitable insulation therebetween. A fine resistance wire 13, preferably a wire that has little change in resistance between room temperature and about 4° K., e.g. manganin, is coiled to form the sensing element. The leads 14, to the measuring circuit are of low resistance relative to the sensing element when in its resistive state, e.g. copper. The leads 14 leads to a suitable measuring circuit to be more particularly described. Though the sensing element has been depicted as being coiled, other configurations could be used. The coiled sensing element 13 is coated with a very thin film of a super-conducting material 6 in FIGURE 5, such as lead-tin solder, having a super-conducting transition slightly above the boiling point of liquid helium or other cooled liquids, the level of which is to be measured. The sensing element contacts the liquid in container 10. The coil of sensing element 13 is extremely small in construction, a suitable coil being approximately ⅛ inch in diameter, ¼ inch long with 10–20 turns. A portion 15 of sensing element 13 is free of coating in order that the wire is resistive at all temperatures. This resistive portion assures that the transition from the super-conducting state to the normal state will be initiated rapidly when the element is removed from the liquid.

In FIGURE 1, $\Delta h$ is indicated as the maximum uncertainty in the level of liquid helium 12. Sensing element 13 may either be mounted at a fixed point in container 10 or on a movable probe 8 which has incremental units indicated thereon. When element 13 contacts liquid 12, the resistance in the wire, due to the super-conductivity characteristic of the coating thereon, is drastically reduced. The resistance change, as will be hereinafter described, will cause an indication in a suitable meter.

The sensing element described above can also be used in a gauge design to indicate the proportional level of liquid helium in a container 10. In FIGURE 2, a gauge has been provided for detecting the actual level of helium above a certain point. In this embodiment, sensing element 13 is held taut between two insulating terminal posts 16 located on a support 18 or attached to experimental apparatus. Element 13 is a straight wire with current leads 21 and voltmeter leads 30. A biasing means, e.g., spring 17, has been found to be suitable for maintaining sensing element 13 in a taut position. With this arrangement, it is necessary that the uncoated or resistive portion 15 of sensing element 13 be located farthest from the helium 12. The resistance of sensing element 13 is proportional to the portion of the element which is not immersed in liquid helium. This can be expressed by designating A as that portion of element 13 which is not immersed in liquid helium whereas B designates the portion of element 13 immersed in the helium. The resistance of the element will then be $$\frac{A}{A+B}R$$

where R is the normal state resistance of element 13. In this modification high accuracy is attained with a four-terminal arrangement so that the voltage drop across the element can be measured.

Suitable circuits serving to indicate the level of the liquid are shown in FIGURES 3 and 4. A microammeter is used as the indicator. Any circuit that provides a current through the sensing element large enough to return it to its normal resistance when free of immersion in the liquid and additionally provides for a sensitive indication of the resistance of the sensing element is suitable. Suitable circuits are illustrated in FIGURES 3 and 4. The choice of resistance, voltage and meter sensitivity are to be most suitable for the size and resistance of the sensing element. The circuit in FIGURE 3, powered from a suitable voltage source 25, is adjusted by means of variable resistance 23. Upon immersion of the gauge in FIGURE 1 into the container of helium, switch 22 is actuated and sensing element 13 contacts the liquid to be measured. The resistance in element 13 is reduced and the change in voltage drop in the circuit across the leads to the sensing element is measured on meter 24. Also connected in parallel with meter 24 is a silicon diode 26 used for protecting the meter in the event of any sudden current increase in the circuit. The circuit shown in FIGURE 4 suitable for use with the modification shown in FIGURE 2 is powered by a constant current power supply 27, supplying a constant current to element 13 through the current leads. A voltmeter 28 in series with an adjustable resistor 29 for meter calibration is connected across the voltage leads.

The foregoing detailed description has been given for clearness of understanding only, and no unnecessary limitations should be understood therefrom, as modifications will be obvious to those skilled in the art.

What is claimed is:

1. In a gauge used for measuring the level of liquid in a container, a sensing element comprising a resistance wire having a super-conducting material coated on a portion thereof while a portion of said wire is free of the super-conducting material, said element exhibiting substantially constant resistance between room temperature to about 4° K., said element being adapted to be immersed in said liquid whereupon the resistance of the portion of the element immersed in said liquid is substantially reduced to zero.

2. A sensing element in accordance with claim 1 wherein said sensing element is coiled at the location where said element contacts said liquid to be measured.

3. A sensing element in accordance with claim 1 wherein said super-conducting material is lead-tin solder.

4. A sensing element in accordance with claim 1 wherein said liquid to be measured is helium.

5. An indicator for measuring the proportional level of a liquid in a container, said indicator comprising:

a pair of spaced supports spaced along the height of said container;

a sensing element comprising a resistance wire having a super-conducting material coated thereon on a portion thereof while a portion of said wire is free of the super-conducting material, said element exhibiting substantially constant resistance between room temperature to about 4° K., said wire being adapted to be partly immersed in said liquid whereby the resistance of the immersed portion of said element is substantially reduced to zero, said element being attached to one of said supports at a point on said element;

and biasing means for tensioning said sensing element, said means being interconnected between said second support and a second point on said sensing element.

6. An indicator in accordance with claim 5 wherein said liquid to be measured is helium.

References Cited by the Examiner

UNITED STATES PATENTS 3,115,612 12/1963 Meissner _____ 338—32
3,184,303 5/1965 Grobin _____ 73—134

OTHER REFERENCES

Review of Scientific Instruments, June 1943, page 188, "An Indicator for the Level of Liquids," A. D. Power.

Review of Scientific Instruments, vol. 27, #12, pages 1024–1027, "Hot Wire Liquid-Level Indicator," Arturo Maimoni.

LOUIS R. PRINCE, *Primary Examiner.*

D. McGIEHAN, *Assistant Examiner.*